United States Patent Office 3,721,911
Patented Mar. 20, 1973

3,721,911
TRIGGER CIRCUIT HAVING THE SAME LEVEL TURNON AND TURNOFF THRESHOLDS
William Louis Aranguren, Sayreville, N.J., assignor to Bell Telephone Laboratories, Incorporated, Murray Hill and Berkeley Heights, N.J.
Filed Sept. 23, 1971, Ser. No. 183,075
Int. Cl. H03k 5/20
U.S. Cl. 328—146
3 Claims

ABSTRACT OF THE DISCLOSURE

A trigger circuit produces an output signal to indicate that the amplitude of a first input signal exceeds the amplitude of a second input signal. The two input signals are applied to a differential amplifier, which modulates the pulse width of a reference signal in accordance with the difference between the two input signals by biasing a pair of oppositely poled diodes. The modulated signal is compared with the unmodulated reference signal by a logic gate to produce an output only when the modulated pulse is not in coincidence with the unmodulated pulse. The output signal from the logic gate triggers a flip-flop circuit which divides by two to provide an output signal which indicates that the first input signal is greater than the second input signal.

BACKGROUND OF THE INVENTION

This relates to trigger circuits and, more particularly, to trigger circuits that have the same low level for the turnon and turnoff thresholds.

In many applications, it is desirable to provide an output signal to indicate the relative strength between two independent signals which are varying in amplitude or strength. For instance, statistical measurements in the communications field pertaining to the relative strength of two signals, each from a different source, require a trigger circuit which exhibits a constant sensitivity or substantially the same turnon and turnoff threshold level as the two signals alternately change relative strengths. Generally, a bi-stable circuit such as the well-known Schmitt trigger circuit is often used to indicate the relative strength of two signals. Typically, Schmitt triggers are used in combination with AND gates to control circuits in response to the strength of the input signals. But when the signals are weak, or strong, but have a tendency to fade out momentarily, a difference between the turnon and turnoff threshold levels of a trigger circuit will give a false indication of the amount of time one signal is stronger than another signal. This difference between the turnon and turnoff threshold levels is the well-known hysteresis effect inherent in Schmitt trigger circuits. Various arrangements have been used to overcome or control the hysteresis effect, but a better arrangement would be to have a trigger circuit that operates in such a manner that it characteristically does not produce a hysteresis effect and has a low threshold level while being highly stable and relatively noise free.

SUMMARY OF THE INVENTION

In an illustrative embodiment of the invention which satisfies the foregoing operating characteristics, two input signals are applied differentially to a first differential amplifier. The output signal of the first differential amplifier indicates the difference between the two input signals and biases a pair of oppositely poled diodes to modulate the pulse width of a reference signal. When the amplitude of one input signal exceeds the amplitude of the other input signal, the difference between the two input signals represented by the output signal of the first differential amplifier increases the pulse width of the modulated signal. The modulated and unmodulated versions of the reference signal are each amplified by a separate amplifier and applied to a logic circuit. A logic gate in the logic circuit produces an output only when the modulated pulse does not coincide with the unmodulated pulse within the duration of the modulated pulse. The output of the logic gate triggers a flip-flop which divides by two to supply one output signal each time the modulated pulse is not in coincidence with the unmodulated pulse within the duration of the modulated pulse.

A feature of the invention is a differential amplifier which compares two input signals and biases a pair of oppositely poled diodes to modulate the pulse width of a reference signal in accordance with the difference between two input signals.

Another feature of the invention is a logic circuit that has a logic gate which produces an output signal each time the modulated signal does not coincide with the unmodulated signal to trigger a flip-flop circuit to provide a low threshold level for the comparison of the two input signals applied to the first differential amplifier.

These and other features of the invention will become apparent upon reading the detailed description in conjunction with the accompanying drawings.

DETAILED DESCRIPTION

Figure 1:
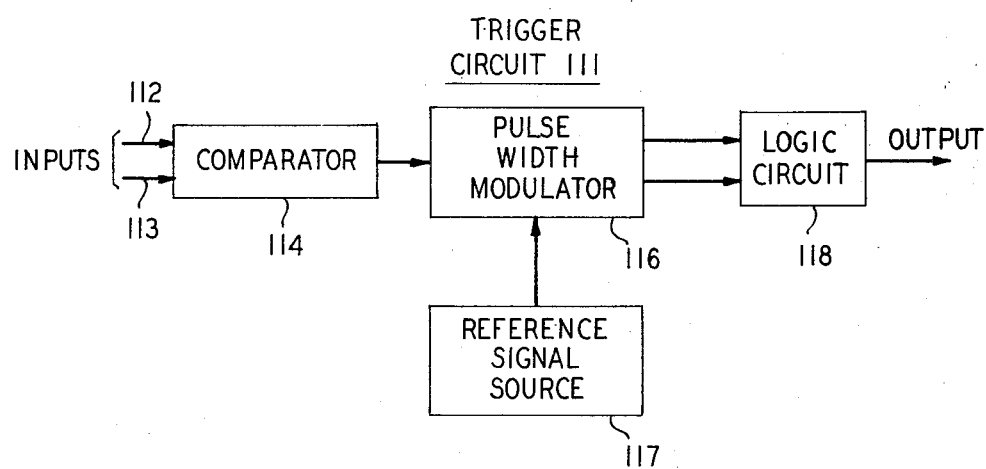
FIG. 1 is a block diagram illustrating a trigger circuit in accordance with the present invention.

FIG. 1 is a block diagram of a trigger circuit 111 embodying the features of the present invention. The trigger circuit 111 comprises a comparator 114 with input terminals 112 and 113, a pulse width modulator 116 connected to a reference signal source 117, and a logic circuit 118. Separate input signals are applied to the input terminals 112 and 113 of the comparator 114 which supplies an output signal in accordance with the difference between the two input signals. The output signal of the comparator 114 is applied to the pulse width modulator 116, which modulates the pulse width of a reference signal from the reference signal source 117 in accordance with the difference between the input signals applied to the input terminals 112 and 113. The pulse width modulator 116 produces a modulated pulse and an unmodulated pulse, which are both applied to the logic circuit 118. The logic circuit 118 detects a lack of coincidence between the modulated pulse and the unmodulated pulse within the duration of the modulated pulse, which indicates that the amplitude of one input signal exceeds the amplitude of the other input signal and produces an output signal to indicate this condition. One of the many possible situations or applications for the invention occurs in mobile radio pilot diversity systems when a vehicle enters an area of co-channel interference between two base stations. Usually these systems employ frequency modulation and the receiver is captured by the stronger signal as the absolute and relative strengths of the signals received at the moving vehicle vary. Therefore, the invention may be used to determine the capture probability of the receiver by the interfering base station.

Figure 2:
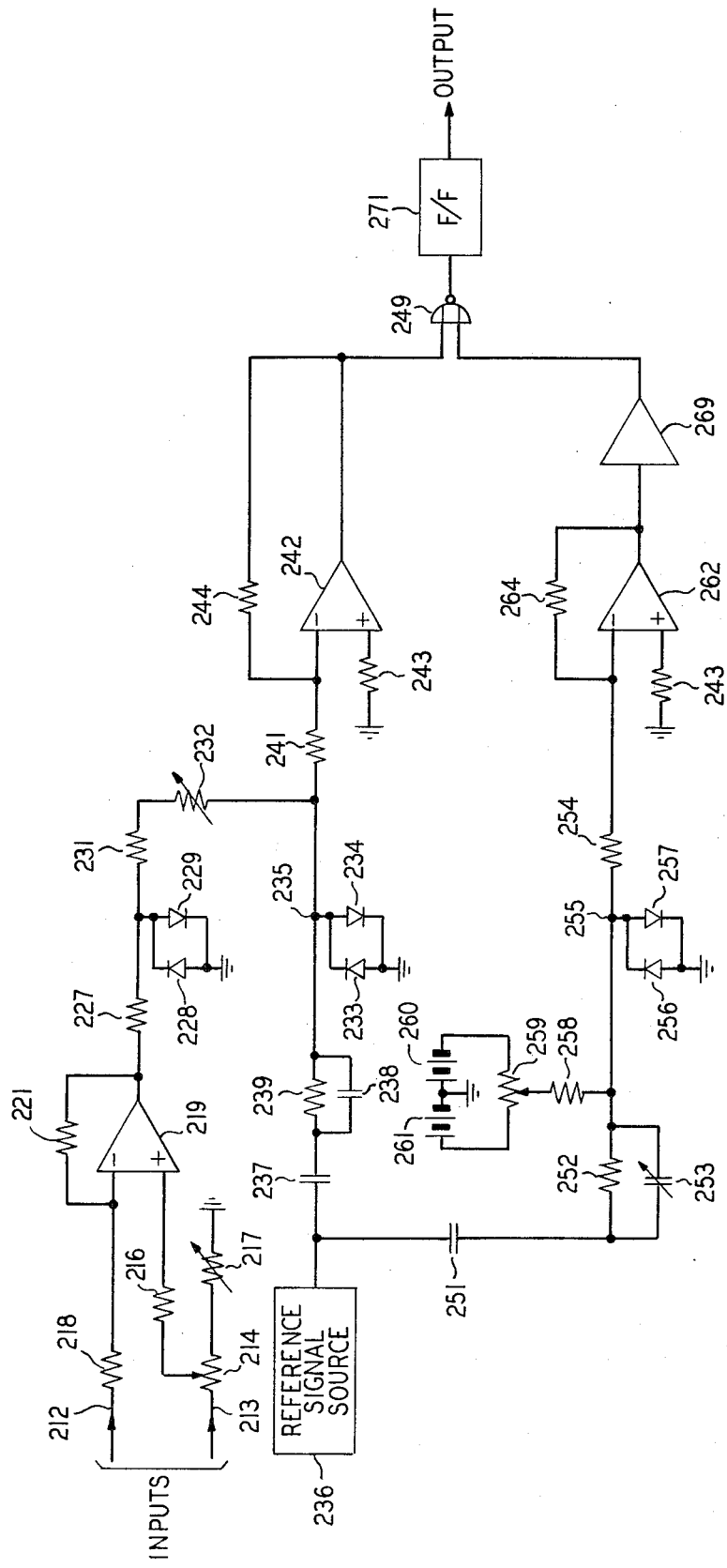
FIG. 2 is a schematic diagram illustrating the detail circuits employed in FIG. 1.

FIG. 2 is a schematic representation of an illustrative embodiment of the present invention. The active circuit components shown in FIG. 2 are: an operational amplifier 219 in the comparator circuit; operational amplifiers 242 and 262 in the pulse width modulator circuit; and a logic gate 249, an inverter 269, and a flip-flop 271 in the logic circuit. Each of these active components may readily be selected by those skilled in the art from a variety of commercially available integrated circuits. The respective operational amplifiers may be modified according to manufacturer's specifications to provide suitable performance at the frequencies of the input signals and the reference signal source.

Two input signals are applied individually to terminals 212 and 213, which are connected respectively to the operational amplifier 219 through a resistor 218 and a resistive network comprising a potentiometer 214 which has its adjustable terminal connected to the operational amplifier 219 through a resistor 216. The potentiometer 214 is also connected in series with a rheostat 217 to ground. Adjustment of either potentiometer 214 or the rheostat 217 controls the portion of the input signal impressed upon one of the inputs of the operational amplifier 219 to provide respective coarse and fine grain controls for the trigger circuit. A feedback resistor 221 is connected from the output to the input of the operational amplifier 219. The relative values of resistors 218 and 221 determine the amount of negative feedback and control the gain of the operational amplifier. Unity gain will provide a sensitivity or a threshold level of about one millivolt for good overall circuit performance. Higher gains may be utilized to provide even lower threshold levels. The output signal from the operational amplifier 219 is applied through a resistor 227 to a pair of oppositely poled limiting diodes 228 and 229. These diodes, 228 and 229, limit the swing of the output signal of the operational amplifier 219 to ensure proper operation of the pulse width modulator circuit. A resistor 231 is connected in series with a rheostat 232 which is adjusted to alter the sensitivity of the trigger circuit. The output signal of the operational amplifier 219 is the difference between the amplitudes of the two input signals applied to terminals 212 and 213.

The output signal of the comparator obtained from the operational amplifier 219 is applied to the pulse width modulator. The output signal of a reference signal source 236 is applied to the operational amplifier 242 of the pulse width modulator through a path comprising a coupling capacitor 237, a capacitor 238 connected in parallel with a resistor 239 which is also connected to an inverting input of the operational amplifier 242 through resistor 241. The junction 235 of resistors 239 and 241 is connected to ground through oppositely poled diodes 233 and 234. The noninverted input of the operational amplifier 242 is connected to ground through a resistor 243. The output signal from the reference signal source 236 is also applied to the operational amplifier 262 of the pulse width modulator through a path comprising a coupling capacitor 251 connected to a resistor 252, which is shunted by a variable capacitor 253 and connected to an inverting input of the operational amplifier 262 through a series resistor 254. Oppositely poled diodes 256 and 257 are connected between ground and the junction 255 of resistors 252 and 254. Diodes 233, 234, 256 and 257 are low capacity diodes which are able to perform clipping at the frequency of the output signal from the reference signal source 236. The oppositely poled diodes 256 and 257 are biased through a network comprising a resistor 258 connected to the adjustable terminal of a potentiometer 259 which is connected between oppositely poled batteries 260 and 261 which are both connected to ground.

The output signal of the operational amplifier 219 biases the oppositely poled diodes 233 and 234 in accordance with the difference between the input signals applied to terminals 212 and 213. The output signal of the reference signal source 236 is also applied to the oppositely poled diodes 233 and 234. The shape of the signal from the reference signal source 236 may be either triangular or sinusoidal. The oppositely poled diodes 233 and 234 clip and pulse-width modulate the reference signal under the influence of the output signal from the operational amplifier 219. The repetition rate or frequency of the reference signal determines the number of times the output signal operational amplifier 219 can produce an output to indicate the relative strength of the two signals. Therefore the frequency of the reference signal is made much higher than the frequency of the input signal to obtain an accurate correlation of the relative amplitude of the input signals. The modulated pulse is amplified by the operational amplifier 242 to enable triggering of the logic circuit. Similarly, the operational amplifier 262 amplifies the unmodulated pulse (which may be slightly modified by the adjustment of the variable capacitor 253 and the potentiometer 259) obtained from the oppositely poled parallel diodes 256 and 257. Adjustment of the variable capacitor 253 controls the phase of the unmodulated signal while adjustment of the potentiometer 259 changes the bias potential on the oppositely poled parallel diodes 256 and 257 and affects the symmetry of the unmodulated pulse. It should be understood that if equal groups of oppositely poled diodes are connected in series to be used in place of diodes 233, 234, 256 and 257, operational amplifiers 242 and 262 may not be required to provide gain and accordingly may be eliminated.

The modulated and the unmodulated pulses are applied to first and second inputs of the logic gate 249 in the logic circuit. However, the unmodulated pulse from the output operational amplifier 242 is inverted by the inverter 269 prior to application to the logic gate 249 to provide the proper polarity logic for the desired gate function. The output signal of the logic gate 249 triggers the flip-flop 271 which divides by two to furnish an output signal corresponding to each time the modulated pulse is out of coincidence with the unmodulated pulse within the duration of the modulated pulse. This condition will occur when the signal supplied to terminal 213 exceeds the amplitude of the signal applied to terminal 212 and a pulse of the reference signal is elongated at the junction 235 due to the output signal of the operational amplifier 219 applying a positive bias to diodes 233 and 234. It should also be understood that the logic circuit can just as easily be arranged to provide an output signal when the modulated pulse is out of coincidence with the unmodulated pulse during the duration of the unmodulated pulse.

Figure 3A:
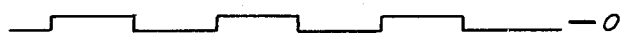
FIGS. 3A, 3B, 3C and 3D are illustrations of waveforms shown for the purpose of explaining the operation of the circuit in FIG. 2.
Figure 3B:
Figure 3C:
Figure 3D:
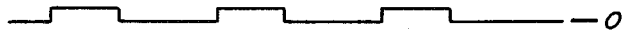

FIGS. 3A, 3B, 3C and 3D depict waveforms of the signals present at various points in the circuit schematically represented by FIG. 2. FIG. 3A depicts the unmodulated pulses which are available from the output of the operational amplifier 262; FIG. 3B depicts the modulated pulses available from the output of the operational amplifier 242; FIG. 3C depicts the output of the logic gate 249; and FIG. 3D depicts the output of the flip-flop 271. The unmodulated and modulated pulses depicted in FIGS. 3A and 3B are actually negative pulses as indicated by the position of the zero reference levels in these figures. Each time the amplitude of the input signal applied to terminal 213 exceeds the amplitude of the input signal applied to terminal 212, the pulses of the modulated reference signal at the diodes 233 and 234 are elongated by the output signal of the operational amplifier 219. These modulated pulses after amplification of the operational amplifier 242 have their negative portions elongated since this part of the waveform, due to the inversion by the operational amplifier 262, corresponds to the positive portion of the waveform before amplification.

The logic gate 249 detects the lack of coincidence between the modulated pulse and the unmodulated pulse and accordingly produces an output pulse. Although the logic gate 249 has amplified and inverted pulses applied to it, it produces an output only when there is a lack of coincidence between the modulated and unmodulated pulses within the duration of the modulated pulse as it originated at oppositely poled diodes 233 and 234.

The flip-flop 271 changes state each time an output pulse from the logic gate 249 appears at its input terminal. Thus the flip-flop 271 divides by two to produce output signals corresponding in number to the number of times the modulated pulse is out of coincidence with the unmodulated pulse within the duration of the original modulated pulse. If the frequency of the reference signal is a multiple of one hundred, then the number of output pulses from the flip-flop 271 represents that portion of time during which the signal applied to the input terminal 213 has a greater amplitude than the input signal applied to the input terminal 212. The output signal of the flip-flop 271 may be used to drive a counter which indicates this portion as a percentage. In such a situation, the percentage of time in which the converse condition occurs may be simply obtained by subtracting the indicated percentage from one hundred. Therefore, when the amplitude of the signal applied to terminal 212 exceeds the amplitude of the signal applied to terminal 213, the levels of the input signals at the logic gate 249 will not permit its output to go high and trigger the flip-flop 271 since no output signal is required.

In all cases it is to be understood that the foregoing described arrangement is merely illustrative of the many possible applications of the principles of the invention. Numerous and varied other modifications of trigger circuits to provide other arrangements in accordance with these principles may readily be devised by those skilled in the art without departing from the spirit and scope of the invention.

What is claimed is:

1. A trigger circuit comprising:
    a differential amplifier for subtracting one input signal from another input signal to produce an output signal corresponding to the difference between the two input signals;
    first means for converting a reference signal into a pulse signal, the output of said differential amplifier being connected to said first means for modulating the pulse width of the pulse signal in accordance with the difference between the two input signals;
    second means for converting the reference signal into a pulse signal containing reference pulses having a width substantially equal to the duration between successive reference pulses; and
    means for comparing the modulated pulse with the unmodulated pulse to produce an output signal when the modulated pulse and the unmodulated pulse are out of coincidence within the duration of the modulated pulse.

2. The trigger circuit of claim 1 wherein said first means comprises a pair of oppositely poled diodes, said diodes being connected in parallel and biased by the output signal of said differential amplifier.

3. The trigger circuit of claim 1 wherein said means for comparing comprises a logic gate having one input to which is applied inverted modulated pulses and another input to which is applied reference pulses to supply output pulses within the duration of the modulated pulses when the modulated pulses are out of coincidence with the reference pulses, and a flip-flop circuit which changes state in response to the output pulses of said logic gate, thereby dividing by two to produce an output pulse for each elongated modulated pulse when the one input signal exceeds the other input signal.

References Cited

UNITED STATES PATENTS 3,562,671   2/1971   Honma et al. _____ 332—23 X

JOHN ZAZWORSKY, Primary Examiner

U.S. Cl. X.R.

307—235; 328—117